April 6, 1926.
G. H. LEWIS
1,580,057
ELECTRICAL CONDENSER AND METHOD OF MAKING AND ADJUSTING THE SAME
Filed April 12, 1922
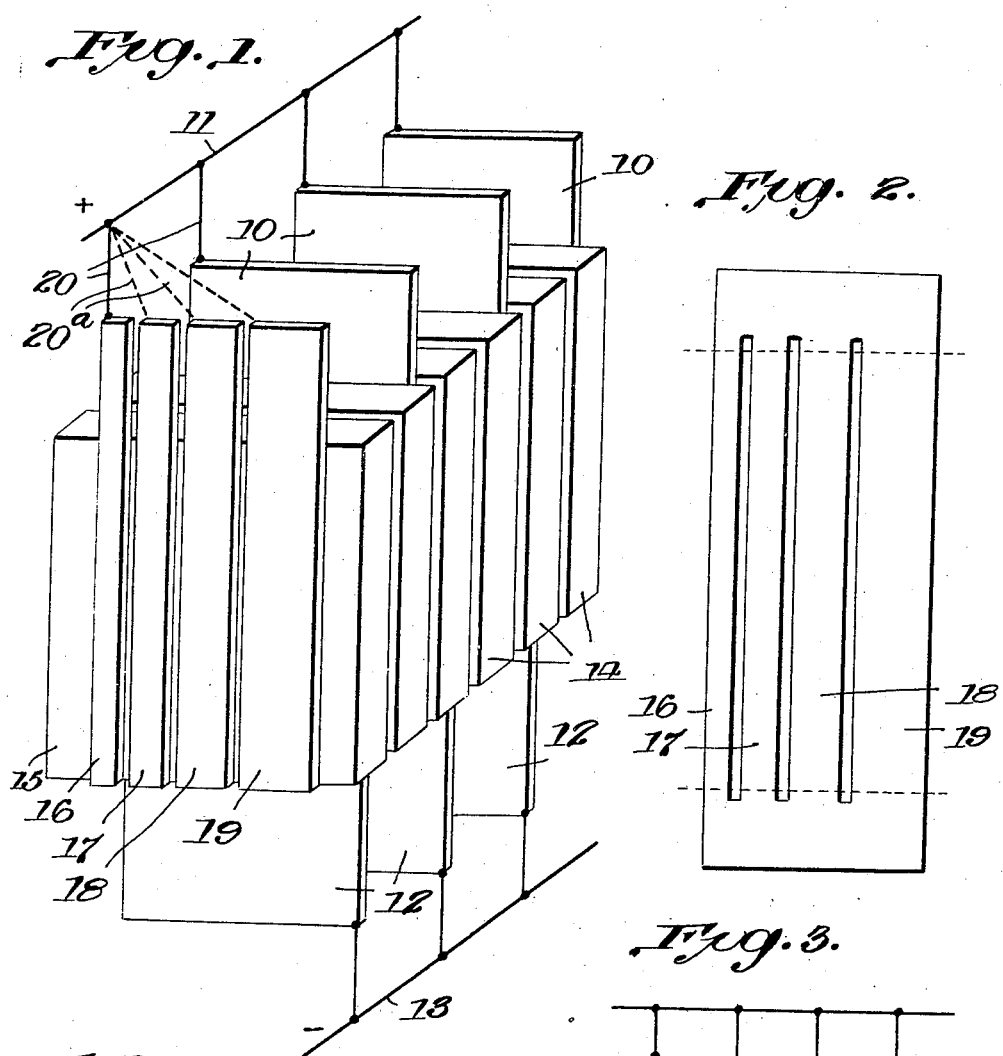
Inventor
George H. Lewis,
By Steward & McKay
his Attorneys Patented Apr. 6, 1926.

1,580,057

UNITED STATES PATENT OFFICE.

GEORGE H. LEWIS, OF ELIZABETH, NEW JERSEY.

ELECTRICAL CONDENSER AND METHOD OF MAKING AND ADJUSTING THE SAME.

Application filed April 12, 1922. Serial No. 551,826.

*To all whom it may concern:*

Be it known that I, GEORGE H. LEWIS, a citizen of the United States, residing at 945 Cross Avenue, Elizabeth, New Jersey, have invented certain new and useful Improvements in Electrical Condensers and Methods of Making and Adjusting the Same; and I do hereby declare the following to be a full, clear, and exact description of the invention, such as will enable others skilled in the art to which it appertains to make and use the same.

My invention relates to electrical condensers and methods of making and adjusting the same; and it relates more particularly to condensers of the stack type.

Many variable factors enter into the manufacture of electrical condensers which heretofore have rendered it difficult if not impossible, at least without prolonged and expensive manufacturing operations, to insure a condenser of the precise capacity desired and the same capacity to every condenser of its class. Among such factors, may be mentioned, for example, variations in the thickness or in the dielectric constant of the supposedly standard mica sheet commonly used as the dielectric in condensers of the stack type, variations in the stack pressure after the component parts of the condenser have been assembled, and finally unavoidable variations in the sealing or waxing operations performed upon the assembled and compressed stacks, which also cause variable changes in their capacities. The capacity usully varies to such an extent that it is necesary to adjust the completed condenser in some way to bring its capacity within allowed variations, that is, within the limits of error permitted in the various uses to which the condenser is put.

Various methods of overcoming the difficulties referred to have heretofore been employed, all of which methods, so far as I am aware, may be included in two classifications according to the type of condenser involved. One employs a plurality of condenser sections or a group of condensers as separate structural units, to be variably connected or one or more of the sections or condensers of the group, to be discarded until the required capacity is attained. The other, in which a single condenser as a unitary structure is employed, requires for the capacity correction, a re-adjustment of the stack pressure or of the effective areas of the charging plates, or both, after the original assembling and clamping of the component parts of the condenser. Certain disadvantages are inherent in the methods and structures referred to as employed in attaining the desired uniform condenser-capacity of the output, which disadvantages it is a principal object of the present invention to overcome. Where the desired total capacity is to be attained by variably connecting a plurality of condenser sections or condensers of a group, of which the separate capacities are not uniform, considerable time is consumed in the adjustment, or comparatively elaborate mechanism required for more rapidly making and varying the connections. Where also a condenser is made up of a series of sections, each designed for a definite potential, and, after completion, the capacity is adjusted by the removal of one or more sections, such removal increases the potential on the remaining sections, a condition which greatly shortens the effective life of the condenser. In addition, the range of adjustment is limited, as obviously such adjustment cannot be made within the capacity limits of a single section. Where a single condenser as a unitary structure is employed, and the capacity adjustment made by a variation of the stack pressure or of the effective areas of the charging plates, or both, a partial disassembling of the once completed and waxed or sealed unit is necessary. In such a disassembling and rearrangement of the component parts of the condenser, the wax or other sealing composition used is very apt to be drawn into or otherwise to penetrate between the dielectric and the charging plates in sufficient quantities to produce brush discharge or otherwise interfere with the normal operations of the again assembled and waxed condenser. Another serious disadvantage of the last mentioned type of condenser is that it is expensive to manufacture. For economical quantity manufacture of electrical condensers, it is essential that uniform manufacturing operations at a uniform rate of performance be carried out. This can be done only by a properly planned method of manufacture in which the operations of compressing and clamping the assembled elements forming each condenser unit and the waxing or sealing of the units all take place in uniformly-timed intervals to correspond to the rate at which the units are received from the assembling department. Where the condenser, after its original assembly, capacity determination and sealing, must, for capacity correction, be partially disassembled, the uniform-time-production system referred to obviously cannot be employed due to the necessarily variable time factors introduced in the disassembling of the condenser and the readjustment of its stack pressure or of the effective areas of its charging plates.

Accordingly, my invention has for one of its objects a condenser as a unitary assembly or structure capable of adjustment as to capacity in a simple and convenient manner without requiring any disassembling or readjustment of the clamping pressure or of the effective areas of the charging plates, which condenser may be used either alone as a single-unit condenser, or with others of its kind in a group. Another object of my invention is the making of a condenser of the required capacity by a method of manufacture economical in quantity production. Other objects and advantages of the invention will appear more fully hereinafter.

My novel condenser, in one of its broad aspects, comprises an assembly of cooperating condenser elements sufficient in numbers and capacities to function as a condenser of approximately the desired capacity when connected in a condenser circuit in fixed circuit relation, that is, without requiring a change of the terminal connections or adjustment of parts, together with means adapted to be interposed in the condenser circuit for varying or adjusting the total capacity of the condenser within the capacity limits of any of the condenser elements. Such capacity-adjusting means may take various forms. In one desirable embodiment of the novel condenser, the capacity-varying or adjusting means comprises supplemental condenser elements of the required relatively small capacities which may be interposed in the circuit either singly or by twos, threes, etc. The supplemental condenser elements may advantageously be made of progressively varying capacities so as to provide for the greatest possible adjustment of the total capacity of the condenser by the least number of supplemental condenser elements. Desirably also, to provide for a fine capacity-adjustment of the condenser, the supplemental condenser elements may be designed to present capacities less than the permissible limit of error in capacity for the use to which the condenser is to be put. And most advantageously, to provide for the greatest possible fineness of adjustment, the capacity of one or more of the supplemental condenser elements may be made as small as is possible within the limits of the physical structure of such an element capable of use in the condenser assembly.

Desirably also, and by the novel method of making a condenser contemplated by my invention, the supplemental condenser elements may be included with the main condenser elements in a single assembly, with their terminals arranged in positions permitting connection in the condenser circuit. The whole assembly may then, by suitable retaining or clamping means, be formed into a single unitary structure, and waxed or sealed and made ready for adjustment and use. A condenser made in the manner described obviously requires no disassembling for adjustment. The total capacity of the main condenser elements is determined by test and should it fall short of the desired capacity, even within the customary limit of error for the use to which the condenser is put, the adjustment may be made by interposing in the circuit one or more of the supplemental condenser elements.

Such a method of manufacture and adjustment offers important advantages and particularly in the quantity production of condensers, and more especially in the quantity production of condensers of the stack-type. All of the steps of manufacture, the assembling of the component parts of the condenser, the clamping of the parts into a unitary whole and the pressure applied thereto, and the waxing and sealing of the unitary assembly, may be performed by uniformly-timed operations, undisturbed by such variable-time factors as the disassembling or partial disassembling of the once assembled and sealed structure for adjustment of the capacity necessary in other types of condensers hereinbefore referred to.

The objects and principles of my invention stated above and other objects and principles will appear from a detailed description hereinafter to be given of illustrative embodiments and of illustrative examples of the novel condenser in preferred forms and of illustrative examples of the novel method of making a condenser and of adjusting the same. It is to be understood, however, that these embodiments and examples hereinafter described are merely illustrative of my invention and that the broad scope of the invention includes various other specific constructions and methods in accordance with its principles, and as defined in the appended claims.

Although the novel condenser and its novel method of manufacture and of adjustment are not confined to condensers of the stack type, they are particularly applicable thereto, and accordingly in the illustrative embodiments and examples, reference will be made to condensers of that type.

In the accompanying drawings, Fig. 1 is a diagrammatic showing in perspective view of an assembly in an electric circuit of the component parts, in operative relation, of a novel condenser of the stack-type embodying my invention, the component parts of the condenser being shown exaggerated in size for the sake of clearness;

Fig. 2 is a plan view, also on an enlarged scale, of a slotted plate or blank from which the supplemental or adjusting condenser elements, later to be referred to, are cut and by which, before severing, the elements referred to are assembled in spaced relation in the condenser;

Fig. 3 is a diagrammatic view showing the circuit connections and cooperative relation of the various condenser elements, and also showing a modification of the assembly of parts shown in Fig. 1;

Fig. 4 is a perspective view of the completed condenser, omitting the customary enclosing casing, with the assembly shown in Fig. 1 compressed and clamped.

To explain the principles of my invention, a typical well-known condenser assembly will first be referred to. Such an assembly, consisting of alternating sheets or plates of conducting and dielectric material, for example of tin foil or other appropriate metal in thin plates and of mica sheets, is included in the diagrammatic illustration of Fig. 1. Fig. 1 shows in addition to the typical well-known assembly referred to, a novel combination embodying my invention and illustrating its principles, but reference will later be made to this. The positive plates 10 are shown connected in parallel to the positive bus-bar 11 of the condenser circuit and the negative plates 12, similarly connected to the negative bus-bar 13, the intervening dielectric sheets being indicated by the numeral 14. For convenience of illustration, only three positive and three negative charging plates are shown, it being understood, of course, that as many may be employed and of such individual capacities as are required to produce, under a definite compression of the assembly, approximately the desired capacity output. It is also to be understood that the assembly is maintained by suitable clamping means (not shown in Fig. 1) under the definite compression referred to.

Let it be assumed that a total condenser capacity of .05 microfarad is desired. In the typical assembly referred to there are five mica sheets under stress. With the connections in the condenser circuit as shown, the areas of the charging plates and the thickness of the mica must be so proportioned as to yield a capacity of .01 microfarad for each mica sheet under stress. If now, by reason of one or more of the variable factors hereinbefore mentioned as entering into the manufacture of a condenser, the total capacity falls short of the required capacity, some means must be resorted to in order to build up or add to the capacity to a point at least within the permissible limit of error from the desired capacity, and the closer the adjustment to the desired capacity the more accurate and effective the condenser will be.

Assume, for example, that in the assembly referred to, the capacity of the individual condenser elements falls short of .01 microfarad for each mica sheet so that the total capacity becomes .049 instead of .050 microfarad, as desired. This represents a drop of .001 microfarad in the capacity, or 2% of the total, an inaccuracy well within the permissible limit of error for a condenser of the type under consideration. To bring the capacity up to the maximum desired, some means must therefore be resorted to in order that an additional capacity of .001 microfarad be added to the circuit. In the commercial manufacture of condensers of this type, having the clamped assembly referred to, this correction can only be made by adjusting the clamping pressure or by releasing the clamping pressure and adjusting the effective areas of the charging plates, and again clamping the assembly under pressure. Either method requires a partial disassembling of the once completed and waxed condenser and a subsequent rewaxing process with the attendant disadvantages hereinbefore referred to. Moreover, where the correction is attempted by an increase of the clamping pressure, in many instances, it is found that the resultant capacity has risen above the desired value and the operation must be repeated until the required capacity is obtained.

A novel method for overcoming these difficulties and disadvantages and a novel condenser, both embodying the principles of my invention, are diagrammatically illustrated in Figs. 1 and 2. In the specific example and embodiment given by way of illustrating the principles of the invention, a sixth sheet of mica, indicated by the numeral 15 in Fig. 1, is stacked over an outer charging plate of the series, in this instance the plate nearest the observer. A series of supplemental condenser elements in the form of relatively narrow charging plates or strips, desirably of progressively varying widths, indicated by the numerals 16, 17, 18 and 19, is then stacked in condenser relation with the mica sheet 15, as indicated, with their edges spaced apart and with ends extended beyond the mica sheet into positions to be connected in the condenser circuit.

Reverting to the assumed capacity values for the assembly of the main condenser elements hereinbefore referred to as a typical condenser assembly, if the supplemental charging strips be of such widths as to present effective areas producing capacities of .001, .002, .003, and .004 microfarad, respectively, then the capacity of the main assembly can be corrected by the addition of .001, .002, .003 and .004 microfarad by connecting the outer terminals or nibs of the strips to the positive bus-bar as indicated in Fig. 1. As these strips function to correct or adjust the capacity of the condenser, they are here termed calibrating plates.

For example, under the assumed conditions of capacity output hereinbefore given, where the capacity output was .049 microfarad and the desired capacity was .050, with the calibrating plates having the capacities mentioned, all that is necessary to correct the capacity of the condenser is to connect the first calibrating plate of the series in the circuit, as diagramatically indicated by the lead line 20 in Fig. 1, which adds the required .001 microfarad.

Had the capacity of the condenser fallen to say .048 microfarad, the correction would be made by connecting the second calibrating plate of the series in the circuit, thereby adding the deficient value of .002 microfarad. In this case the lead wire 20, shown in full lines in Fig. 1, would be disconnected from the first plate and connected to the second as shown in dotted lines at 20ª.

Again, should the capacities of the main condenser elements yield a total of .045 microfarad instead of .050, the correction would then be made by utilizing either the first and the last calibrating plate of the series or the second and third, those not thus utilized being of course left unconnected to the circuit.

In function, the pairs of charging and dielectric condenser elements in the main assembly and the supplemental dielectric sheet and calibrating plates associated therewith may be considered as a plurality of condenser sections or as a system of condensers, connected in the same condenser circuit. In this system, the supplemental dielectric sheet and calibrating plates may be said to be a calibrating section or a calibrating condenser. In fact, to obtain the advantage of the capacity-adjustment, the condenser sections referred to need not necessarily be in a unitary assembly such as diagramatically illustrated in Fig. 1 and shown in complete form in Fig. 4. The main condenser elements may be in one assembly and the supplemental or calibrating condenser elements in another; or all may be distributed in separate assemblies or sections each having a sufficient number of charging plates and dielectric sheets in cooperative relation to function as a condenser or condenser section. The last mentioned distribution is diagramatically illustrated in Fig. 3, where the extreme left hand assembly, as viewed in the figure, is the correcting or calibrating section or condenser.

The numerous advantages of my invention hereinbefore enumerated are better realized however by a unitary assembly such as that diagramatically illustrated in Fig. 1 and shown completed in Fig. 4.

In the preferred practice of the novel method of making the condenser, therefore, main condenser elements of charging plates and dielectric sheets are provided sufficient in numbers and capacities, when co-operatively assembled together in the condenser circuit, to produce approximately the desired capacity, and the calibrating plates and cooperating dielectric sheet are included in the same assembly. By this method, it is only necessary to make the main portion of the condenser, consisting of the main condenser elements, of approximately the correct capacity-values and to provide a series of supplemental condenser elements, the calibrating plates in the specific example, of such capacities as to enable the capacity of the main portion of the condenser to be built up or added to by small increments.

The assumed capacity-values hereinbefore referred to, for the main and supplemental or calibrating condenser elements, are, of course, merely illustrative, as are likewise the number of such elements shown in the drawings. In any instance, supplemental or calibrating condenser elements are used having small capacities compared with the capacities of the main condenser elements. Preferably, to provide for extreme fineness of adjustment, at least one of the supplemental or calibrating condenser elements is made of the smallest possible capacity, dependent upon the effective area of the smallest element found capable of use in the assembly and of terminal connection in the circuit. Desirably, also, these supplemental or calibrating condenser elements are of graded capacities from the least, referred to, to the greatest having a capacity within the permissible limit of error for the condenser, although the upper range of capacities may, if desired, exceed that limit. The form of supplemental or calibrating condenser elements and their capacities will depend upon the type of condenser, its required capacity, and the fineness of adjustment desired. In the stack-type of condenser here referred to by way of illustrating the principles of the invention, I have found four or five calibrating plates of copper foil and graded in widths from .05 to .25 inch to function satisfactorily. In the typical assembly hereinbefore referred to, and with the main condenser elements having the assumed capacity values mentioned, which are average values for condensers of this type, such calibrating plates yield capacity-adjustment values ranging from approximately 2 to 8 per cent of the required capacity of the condenser, depending upon the number of the calibrating plates of the series connected in the circuit, beginning with the one of least capacity. As distinguished from these close adjustments, it is to be observed that with the methods hereinbefore referred to as employed heretofore in commercial condenser construction, it is extremely difficult in a condenser of the type under discussion to obtain an adjustment or calibration of the capacity within 10 per cent of the total capacity required.

For convenience in assembling calibrating plates of such narrow widths in the cooperative relation with the main condenser elements diagrammatically illustrated in Fig. 1, a plate, of the material desired for the calibrating plates, is provided as shown in Fig. 2, with longitudinal slots progressively spaced apart to form strip-like sections 16, 17, 18 and 19. This plate is stacked against the supplemental dielectric sheet 15, Fig. 1, with the slotted-end portions of the plate projecting beyond the corresponding ends of the dielectric sheet. An additional mica sheet 21, Fig. 4, may then be placed over the slotted plate. Reinforcing plates 22 are desirably, but not necessarily, added to the assembly as shown in Fig. 4, and the whole encompassed by a suitable retaining member or clamp as indicated by the numeral 23. As hereinbefore stated, the assembly includes main condenser elements of charging plates and dielectric sheets sufficient in numbers and capacities to yield, under a given compression, approximately the required capacity, and the predetermined pressure is applied to the assembly either by means of the screws 24 of the clamp or in any other convenient manner and the assembly retained approximately under that pressure by the clamp. The projecting end portions of the slotted plate are then severed along lines within the end limits of the slots indicated by the dotted lines in Fig. 2, thus forming the calibrating plates in spaced positions in the assembly as indicated at 16, 17, 18, and 19 in Figs. 1 and 4.

The predetermined pressure applied to the completed assembly is that which, for the numbers and capacities of the condenser elements, will, as already stated, complete the condenser of approximately the desired capacity. A pressure is avoided which would increase the capacity above the desired maximum. The completed, compressed and clamped assembly is then subjected to the customary vacuum and waxing or sealing processes. As the waxing or sealing is the last step of the manufacture which varies to any substantial extent the capacity of the assembly, the condenser is thereafter tested for capacity with the charging plates, indicated by the numerals 10 and 12, Figs. 1 and 4, in the condenser circuit. If the capacity falls short of that for which the condenser was designed, adjustment is made to the intended capacity in the manner hereinbefore explained by connecting one or more of the calibrating plates in the circuit by leads 20, Fig. 1, which may be attached to the protruding nibs or terminals of the plate or plates required to bring the capacity of the condenser as a whole up to the required amount. The adjustment performed in the manner just stated determines which of the calibrating plate or plates shall be active in the completed condenser, and when the desired capacity has thus been obtained it is fixed as the capacity of the condenser, the protruding nibs or terminals of the remaining inactive plate or plates, that is the plate or plates not required in bringing the total capacity of the condenser up to standard, being preferably severed to prevent the unused plates from adding to the capacity of the condenser by accidental contact of their nibs or terminals with the condenser case or one of the charging plates.

The capacity-adjustment referred to, having been made, the completed condenser is sealed in the usual manner in an enclosing case, not shown, and is ready for use.

The method of manufacture of a condenser described above enables the production of a condenser having a precise, predetermined and fixed capacity value when completed.

What I claim is:

1. The method of making a condenser having a desired capacity value within prescribed limits of error, which comprises assembling together in cooperative relation in a single condenser unit conducting and dielectric condenser elements sufficient in numbers and capacities to provide a condenser of approximately the desired capacity and assembling to form a part of said single unit and in cooperative relation with a dielectric condenser element a plurality of supplemental condenser elements of such capacities that the connection or disconnection of any one of said supplemental conducting elements in the condenser circuit will produce a change in capacity of the condenser less than the permissible error.

2. The method of making a condenser having a desired capacity value, which comprises assembling a plurality of main and supplemental condenser elements in a single condenser unit with said main condenser elements sufficient in numbers and capacities to approach but not to exceed the desired capacity for said condenser and with said supplemental condenser elements of such capacities that the connection or disconnection of any one of them in the condenser circuit will produce a change in the capacity of the condenser less than the permissible error, adjusting the capacity of the condenser to the desired capacity as a step in its manufacture by connecting the terminals of said main condenser elements and of the requisite number of said supplemental condenser elements in circuit and fixing said desired capacity of said condenser by a subsequent step of manufacture in the completion of said condenser presenting the terminals of said requisite number only of supplemental condenser elements for connection in a condenser circuit in the use of the completed condenser.

3. The method of making a condenser having a desired capacity value within the prescribed limits of error, which comprises assembling a plurality of main and supplemental condenser elements in a single condenser unit with said main condenser elements sufficient in numbers and capacities to provide a condenser of approximately the desired capacity when connected in the condenser circuit and said supplemental condenser elements of such capacities that the connection or disconnection of any one of them in the condenser circuit will produce a change in the capacity of the condenser less than the permissible error, adjusting the capacity of the condenser to the desired capacity by connecting the terminals of said main condenser elements and of the requisite number of said supplemental condenser elements in a condenser circuit and then fixing said desired capacity of said condenser by severing the terminals of those supplemental condenser elements not required to attain said desired capacity.

4. The method of making a condenser of the stack type having a desired capacity value, which comprises assembling together in alternate relation conducting and dielectric sheets in numbers and capacities to produce under a given pressure applied to said assembly a condenser of approximately the desired capacity, including in said assembly in separate condensing relation with a dielectric sheet a plurality of conducting strips having terminals adapted for connection in the condenser circuit, applying the given pressure to said assembly and retaining said assembly under said pressure by suitable clamping means, adjusting the capacity of said condenser to the desired capacity by connecting said conducting sheets and the requisite number of said strips in the condenser circuit, and then severing the terminals of the unconnected strips.

5. The method of making a condenser of the stack type having a desired capacity value, which comprises assembling together in alternate relation sheets of conducting and dielectric materials in numbers and capacities to produce under a given pressure applied to said assembly a condenser of approximately the desired capacity, including in said assembly in separate condensing relation with a sheet of dielectric material a plurality of strips of conducting material of such capacities under said pressure that the connection or disconnection of any one of said strips in the circuit of said condenser will produce a change in the capacity of said condenser less than the permissible error, applying said pressure to said assembly and retaining said assembly under said pressure by a suitable clamping device, whereby said sheets of conducting material and the requisite number of said strips of conducting material may be connected in an electric circuit.

6. The method of making a condenser of the slack type having a desired capacity value, which comprises assembling together in alternate relation sheets of conducting and dielectric material in numbers and capacities to produce under a given pressure applied to said assembly a condenser of approximately but not greater than the desired capacity and with said conducting sheets having terminals in positions permitting connection in a condenser circuit, including in said assembly in separate condensing relation with a sheet of dielectric material a plurality of strips of conducting material with ends exposed as terminals for connection in the condenser circuit, said strips having such capacities under said pressure that the connection or disconnection of any one of said strips in the circuit of said condenser will produce a change in the capacity of said condenser less than the permissible error, applying a given pressure to said assembly and retaining said assembly under said pressure by a suitable clamping device and sealing said assembly with the terminals of said conducting sheets and strips in positions permitting connection in a condenser circuit.

7. The method of making a condenser of the stack type having a desired capacity value, which comprises assembling together in alternate relation sheets of conducting and dielectric material in numbers and capacities to produce under a given pressure applied to said assembly a condenser of approximately the desired capacity and with terminal portions of said conducting sheets in exposed positions permitting connection thereof in a condenser circuit, providing a sheet of conducting material longitudinally slotted to form strip-like sections of said sheet having a total capacity when included in said assembly in cooperative relation with a sheet of dielectric material less than the capacity of any one of said sheets of conducting material in said assembly, including said slotted sheet of conducting material and a sheet of dielectric material in cooperative relation in said assembly, with slotted-end portions of said conducting sheet exposed, compressing and clamping said assembly and cutting said slotted-end portions of said sheet transversely of said strip-like sections to produce spaced strips of conducting material in said assembly with terminals in positions permitting connection thereof in a condenser circuit.

8. A condenser of the stack type comprising in combination, an assembly of alternate sheets of conducting and dielectric material in numbers and capacities to produce under a given pressure applied to said assembly a condenser of approximately the desired capacity and a plurality of strips of conducting material in cooperative relation with a dielectric of such capacities under said pressure that the connection or disconnection of a strip in the circuit of said condenser will produce a change in the capacity of said condenser less than the permissible error, means for holding said assembly under a fixed pressure, said sheets and strips of conducting material being provided with terminal portions positioned in said assembly permitting connections thereof with an electric circuit.

In testimony whereof I hereunto affix my signature.

GEORGE H. LEWIS.